United States Patent
Yokota et al.

(10) Patent No.: US 6,867,567 B2
(45) Date of Patent: Mar. 15, 2005

(54) BATTERY STATE MONITORING CIRCUIT

(75) Inventors: Hiroyasu Yokota, Chiba (JP); Atsushi Sakurai, Chiba (JP)

(73) Assignee: Seiko Instruments Inc., Chiba (JP)

(*) Notice: Subject to any disclaimer, the term of this patent is extended or adjusted under 35 U.S.C. 154(b) by 285 days.

(21) Appl. No.: 10/076,744

(22) Filed: Feb. 14, 2002

(65) Prior Publication Data
US 2002/0109484 A1 Aug. 15, 2002

(30) Foreign Application Priority Data
Feb. 15, 2001 (JP) ........................................ 2001-039083

(51) Int. Cl.$^7$ ................................................. H02J 7/00
(52) U.S. Cl. ....................................................... 320/134
(58) Field of Search ................................ 320/134, 136, 320/132, 160, 162

(56) References Cited

U.S. PATENT DOCUMENTS 5,493,197 A * 2/1996 Eguchi et al. ............... 320/134
6,504,345 B2 * 1/2003 Sakurai et al. .............. 320/134

* cited by examiner

Primary Examiner—Pia Tibbits
(74) Attorney, Agent, or Firm—Adams & Wilks

(57) ABSTRACT

In a battery state monitoring circuit and a battery device using the same, even if a charge inhibiting signal is inputted to a microcomputer control terminal, a lock mode is prevented from occurring in which both a charge control transistor and a discharge control transistor are turned OFF and a battery voltage can not be supplied to a load. A circuit is structured such that even if the charge inhibiting signal is inputted to the microcomputer control terminal, in the case where the overcurrent voltage detection terminal comes to have the overcurrent detection voltage, the charge inhibiting signal of the microcomputer control terminal is cancelled.

12 Claims, 4 Drawing Sheets

BATTERY STATE MONITORING CIRCUIT

OVERCHARGE DETECTING CIRCUIT

BOX CIRCUIT

OVERCURRENT DETECTING CIRCUIT

BATTERY STATE MONITORING CIRCUIT

BACKGROUND OF THE INVENTION

1. Field of the Invention

The present invention relates to a battery state monitoring circuit provided with a charge control transistor gate connection terminal, a discharge control transistor gate connection terminal, an overcurrent voltage detection terminal, and a microcomputer control terminal.

2. Description of the Related Art

In general, as shown in FIG. 2, a battery state monitoring circuit 22A is provided with respective battery voltage monitor terminals 5A to 9A, a charge control transistor gate connection terminal 10A (hereinafter sometimes referred to as a COP terminal), a discharge control transistor gate connection terminal 11A (hereinafter sometimes referred to as a DOP terminal), an overcurrent voltage detection terminal 12A (hereinafter sometimes referred to as a VMP terminal), and a microcomputer control terminal (hereinafter sometimes referred to as a CTL terminal) 13A. A rechargeable battery device is comprised of a charge control transistor 14A, a discharge control transistor 16A, a VMP terminal pull-up resistor 18A, and secondary batteries 1A to 4A. A microcomputer up 21A is connected to the CTL terminal 13A, and a load 19A and a charger 20A are connected between external terminals EB+ and EB− of the battery device.

The VMP terminal 12A is pulled up to VDD by the pull-up resistor 18A in a normal state. The VMP terminal 12A monitors a voltage between VDD and the VMP terminal, detects that the voltage is lowered from VDD by a certain voltage, and causes the DOP terminal 11A to output "H". That is, VMP="L" leads to DOP="H", and the discharge control transistor 16A is turned OFF.

The CTL terminal 13A is a terminal for carrying out communication between the battery state monitoring circuit 22A and the microcomputer 21A. In FIG. 2, showing the conventional circuit, when a charge inhibiting signal (here, an overcharge inhibiting signal is assumed to be "H") is input to the CTL terminal 13A, the COP terminal 10A is made to output "H". That is, CTL="H" leads to COP="H", and the charge control transistor 14A is turned OFF. Here, arrows shown in FIG. 2 indicate the flow of signals.

FIG. 4 is a timing chart showing the relation between signals at the CTL, VMP and COP terminals of the conventional battery state monitoring circuit and the rechargeable battery device using the same. In accordance with FIG. 4, when the charge inhibiting signal is input from the microcomputer 21A to the CTL terminal 13A, the COP terminal 10A outputs "H" to turn OFF the charge control transistor 14A to stop charging of the secondary batteries 1A–4A. When the VMP terminal voltage reaches a detection voltage by a signal of overcurrent or the like, the DOP terminal outputs "H" to turn OFF the discharge control transistor 16A.

That is, when CTL="H", it is determined COP="H" irrespective of the signal of the VMP terminal 12A.

In the conventional battery device, when the charge inhibiting signal is inputted to the CTL terminal 13A from the microcomputer 21A, both the charge control transistor 14A and the discharge control transistor 16A are turned OFF, and there has been a problem in that even if a load is connected between the terminals EB+ and EB−, it is locked in a state where a battery voltage can not be supplied.

In FIG. 2, when the charge inhibiting signal is inputted from the microcomputer 21A to the CTL terminal 13A, the COP terminal 10A outputs "H", and the charge control transistor 14A is turned OFF. At this time, if the load is connected between the terminals EB+ and EB−, since a current flows through a parasitic diode 15A of the charge control transistor 14A, a voltage drop of a junction voltage (VF) of the parasitic diode 15A is generated between the VDD and the EB+. Here, since the VMP terminal 12A monitors the voltage between the VDD and the VMP terminal, overcurrent detection is caused by the voltage drop, the DOP terminal outputs "H", and the discharge control transistor M2 is turned OFF.

SUMMARY OF THE INVENTION

In order to solve the foregoing problem, according to the present invention, a circuit is added to cancel a charge inhibiting signal of the CTL terminal 13A in a case where the VMP terminal 12A comes to have an overcurrent detection voltage when the charge inhibiting signal is input to the CTL terminal 13A, whereby a lock mode is prevented from occurring in which both the charge control transistor 14A and the discharge control transistor 16A are turned OFF and a battery voltage can not be supplied to a load.

The present invention is constructed such that there is added a circuit for canceling the charge inhibiting signal of the CTL terminal 13A in the case where the VMP terminal 12A comes to have the overcurrent detection voltage while the charge inhibiting signal is being input to the CTL terminal 13A, in a battery state monitoring circuit.

DETAILED DESCRIPTION OF THE PREFERRED EMBODIMENTS

Figure 1:
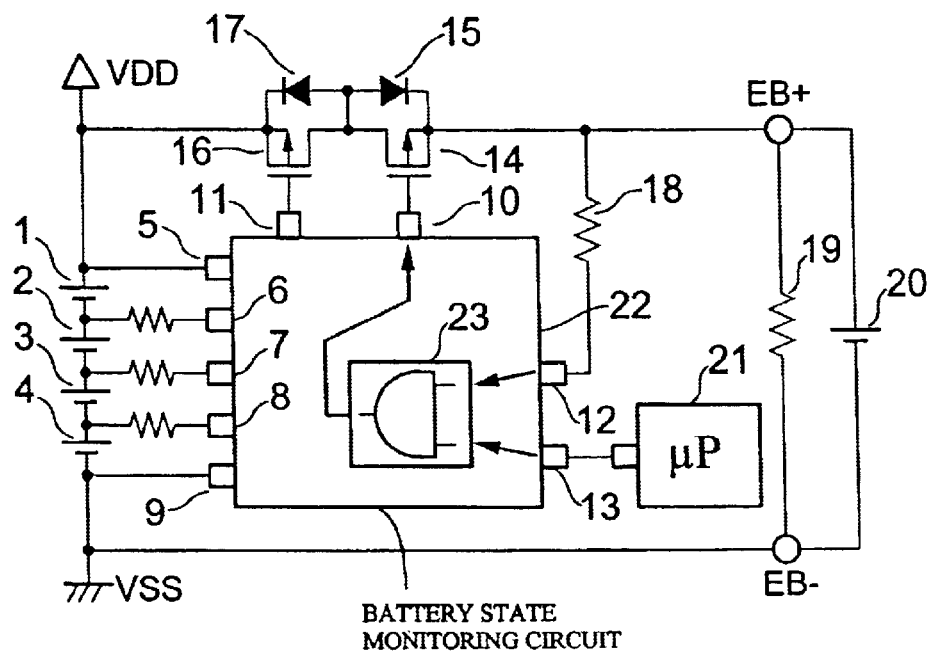
FIG. 1 is a view showing a battery state monitoring circuit of the present invention.
Figure 2:
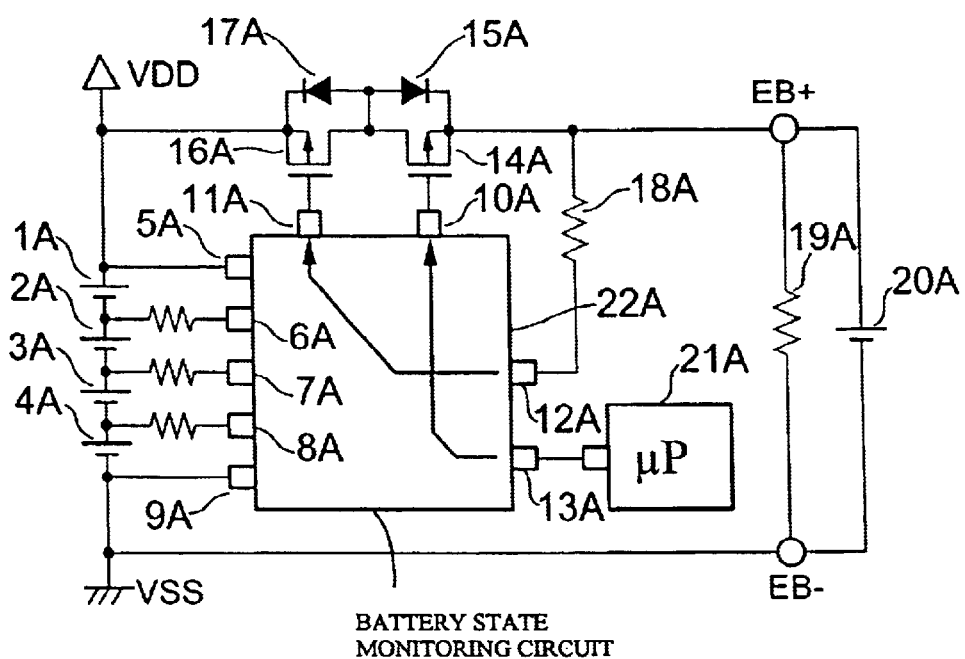
FIG. 2 is a view showing a conventional battery state monitoring circuit.
Figure 5:
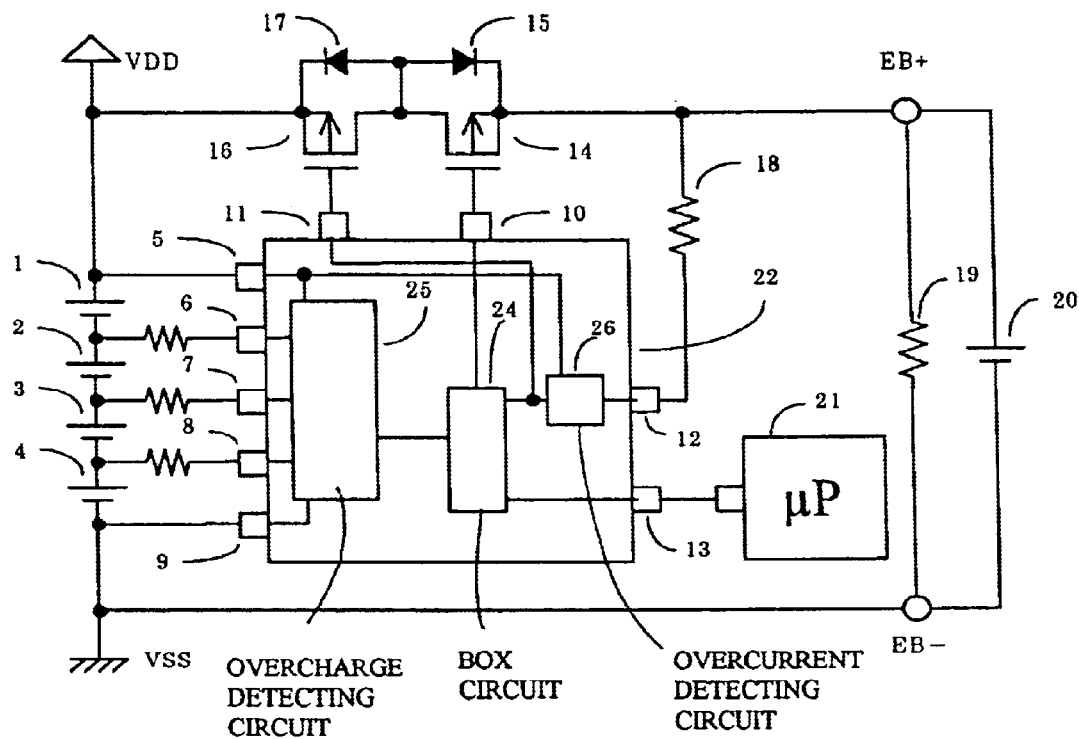
FIG. 5 is a view showing a battery state monitoring circuit of the present invention.

FIG. 1 shows a structural example of a battery state monitoring circuit to which the present invention is applied and a battery device using the same. Hereinafter, an embodiment of the present invention will be described with reference to FIG. 1. In FIGS. 1 and 5, elements similar to those shown in FIG. 2 are identified with like reference numerals with the letter "A" omitted therefrom.

In FIG. 1, a plurality of secondary batteries 1 to 4 (for example, cells of lithium ion batteries) are connected in series with one another. A positive electrode of the secondary battery 1 is connected to a discharge control transistor 16 formed of an FET or the like. The discharge control transistor 16 and a charge control transistor 14 are connected in series with each other, and the charge control transistor is directly connected to an external terminal EB+ of a battery device. The charge control transistor 14 and the discharge control transistor 16 are used as switching elements for controlling discharge from the battery device and charge from a charger. When charging of the battery device by the charger is inhibited, the charge control transistor 14 is turned OFF. When discharge from the battery device is being inhibited, the discharge control transistor 16 is turned OFF.

The present invention includes a circuit structure that functions such that if a charge inhibiting signal is being input to a CTL terminal 13, in a case where VMP terminal 12 comes to have an overcurrent detection voltage, the charge inhibiting signal of the CTL terminal 13 is cancelled to permit charging of a secondary battery.

In FIG. 1, the symbol of an AND circuit is used merely as an example of a logic circuit, and all circuits corresponding to the foregoing circuit structure are referred to herein as a Box circuit 23 in FIG. 1 and FIG. 5. Arrows in FIG. 1 each indicate the flow of signals.

Figure 3:
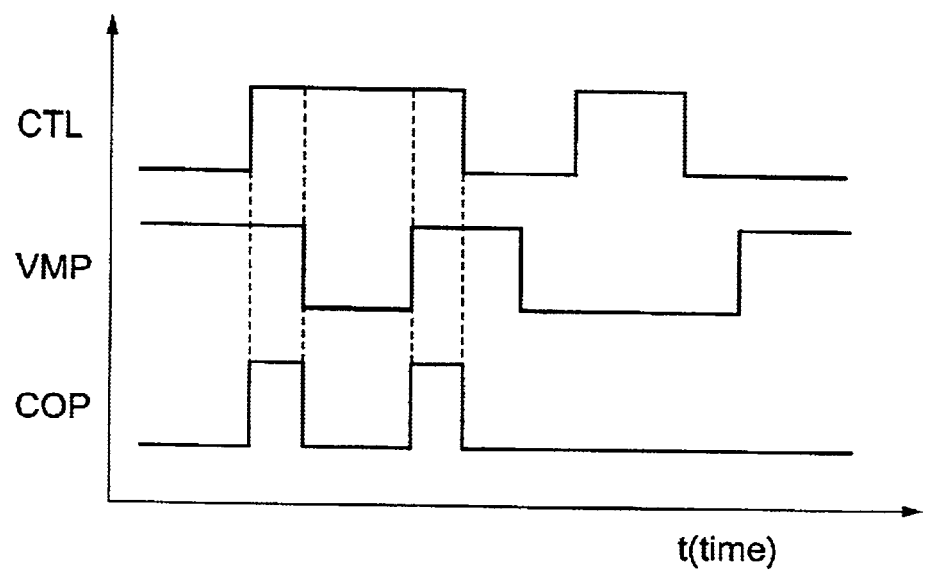
FIG. 3 is a timing chart of the battery state monitoring circuit of the present invention.
Figure 4:
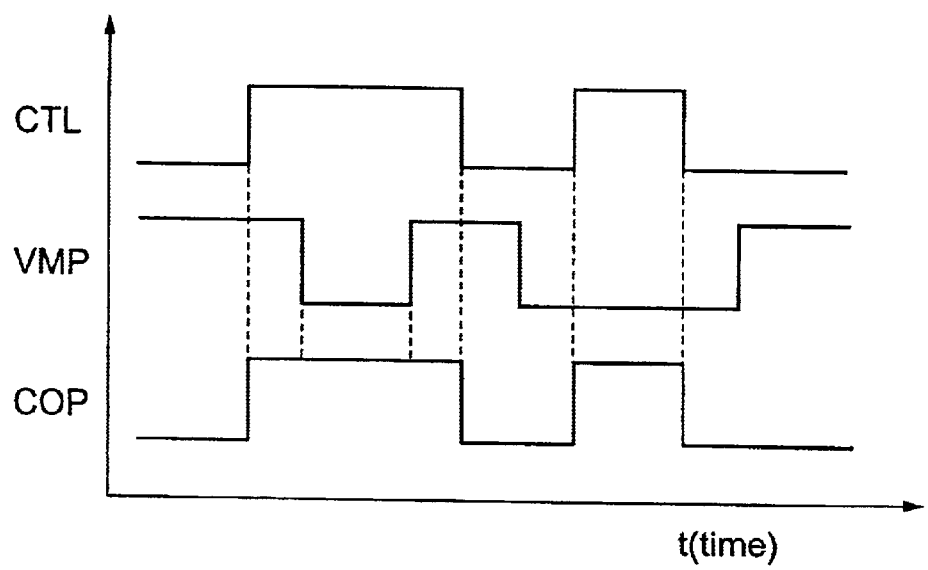
FIG. 4 is a timing chart of the conventional battery state monitoring circuit.

FIG. 3 is a timing chart showing the relation between the terminals CTL, VMP and COP of the battery state monitoring circuit of the present invention and the battery device using the same. In accordance with FIG. 3, when CTL="H" and VMP="L", it is determined COP="L", and only when CTL=VMP="H", it is determined COP="H".

In FIG. 1 of the present invention, although the charge and discharge control transistors 14 and 16 are Pch transistors, Nch transistors can also be used by inverting the logic of the battery state monitoring circuit.

FIG. 5 is a block diagram showing another example of a battery state monitoring circuit of the present invention and a battery device using the same. In FIG. 5, an overcharge detecting circuit 25 and an overcurrent detecting circuit 26 are newly added, and a Box circuit 24 is provided instead of the Box circuit 23. The others are the same as those of FIG. 1.

The overcharge detecting circuit 25 is connected with battery voltage monitor terminals 5 to 9 as input, and monitors the respective voltages of secondary batteries 1 to 4. The overcharge detecting circuit 25 outputs a charge inhibiting signal to the Box circuit 24 in a case where any one of the secondary batteries 1 to 4 exceeds an overcharge detection voltage.

The overcurrent detecting circuit 26 is connected with the battery voltage monitor terminal 5 and an overcurrent voltage detection terminal 12 as inputs, and monitors a voltage difference between the two input terminals. In the case where a discharge current becomes high, a voltage difference generated from a product of the discharge current and channel resistance of a charge control transistor 14 and a discharge control transistor 16 becomes high, and it exceeds the overcurrent detection voltage, the overcurrent detecting circuit outputs a discharge inhibiting signal to the Box circuit 24 and a discharge control transistor gate connection terminal 11.

The Box circuit 24 is connected with a control terminal 13 for a microcomputer, an output from the overcharge detecting circuit 25, and an output from the overcurrent detecting circuit 26 as inputs. In the case where a charge inhibiting signal from the overcharge detecting circuit 25 or a charge inhibiting signal from the microcomputer is input, the Box circuit outputs a charge inhibiting signal to a charge control transistor gate connection terminal 10. However, when a discharge inhibiting signal is output from the overcurrent detecting circuit 26, the Box circuit cancels at least the charge inhibiting signal from the microcomputer.

In FIG. 5, when the charge inhibiting signal is input from a microcomputer 21 to the Box circuit 24 through the CTL terminal 13, the Box circuit 24 outputs the charge inhibiting signal to the charge control transistor gate connection terminal 10. Then, the charge control transistor 14 is turned OFF. At this time, if a load is connected between terminals EB+ and EB−, since a current flows through a parasitic diode 15 of the charge control transistor 14, a voltage drop corresponding to a junction voltage (VF) of the parasitic diode 15 is produced between VDD and EB+. Then, a voltage of the VMP terminal 12 monitoring a voltage between VDD and the VMP terminal is lowered, and the overcurrent detecting circuit 26 outputs a discharge inhibiting signal. When the discharge inhibiting signal is inputted to the Box circuit 24, the charge inhibiting signal from the microcomputer is cancelled, and the charge control transistor 14 is turned ON. Then, since the voltage drop corresponding to the junction voltage (VF) of the parasitic diode 15 is not produced, the overcurrent detecting circuit 26 does not output the discharge inhibiting signal, and the discharge control transistor 16 is kept in the ON state. Accordingly, in the battery device of the present invention, in the case where the load is connected between the terminals EB+ and EB−, even if the charge inhibiting signal is inputted to the CTL terminal 13 from the microcomputer 21, both the charge control transistor 14 and the discharge control transistor 16 are not turned OFF, and it becomes possible to continue to supply the battery voltage. Note that although not shown in FIG. 5, there is a case where a predetermined delay is provided in a signal outputted from the overcurrent detecting circuit 26 to the discharge control transistor gate connection terminal 11.

Figure 6:
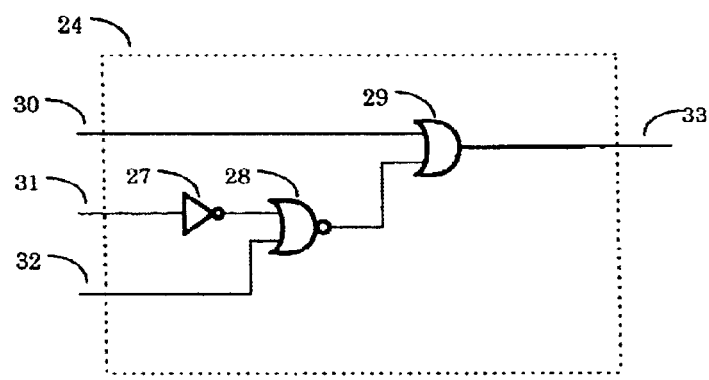
FIG. 6 is a BOX circuit of the present invention.

FIG. 6 is a block diagram showing an example of the Box circuit of the present invention.

The circuit of FIG. 6 is constituted of an inverter 27, a NOR gate 28, and an OR gate 29. An input signal 30 from the overcharge detecting circuit 25, an input signal 31 from the microcomputer 21, and an input signal 31 from the microcomputer 21, and an input signal 32 from the overcurrent detecting circuit 26 are respectively input. An output signal 33 is connected to the charge control transistor gate connection terminal 10.

In the case where "H" as the charge inhibiting signal is input as the input signal 30 from the overcharge detecting circuit 25, "H" as the charge inhibiting signal is output as the output signal 33.

In the case where "H" as the charge inhibiting signal is input as the input signal 31 from the microcomputer 21, and further, "L" as a discharge permitting signal is input as the input signal 32 from the overcurrent detecting circuit 26, "H" as the charge inhibiting signal is output as the output signal 33.

In the case were "H" as the charge inhibiting signal is input as the input signal 33 from the microcomputer 21, and further, "H" as the discharge inhibiting signal is input as the input signal 32 from the overcurrent detecting circuit 26, "L" as a charge permitting signal is outputted as the output signal 33.

As stated above, the Box circuit of FIG. 6 realizes the operation of the present invention by a simple circuit. That is, in the case where the discharge inhibiting signal is outputted from the overcurrent detecting circuit 26, at least the charge inhibiting signal from the microcomputer can be cancelled.

Figure 7:
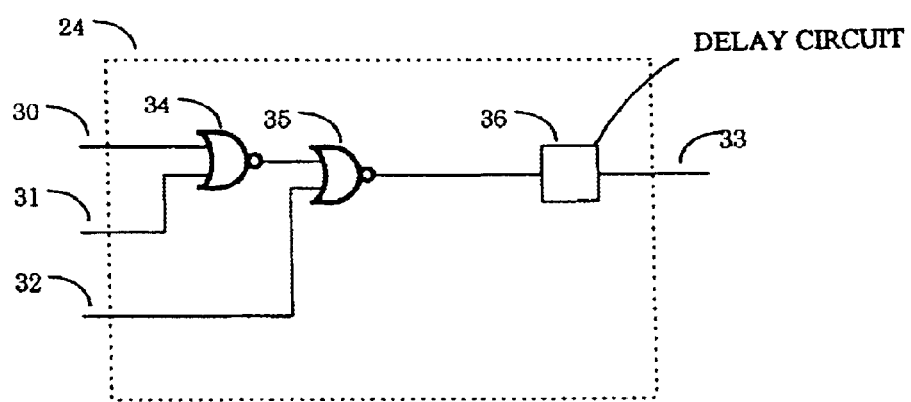
FIG. 7 is a BOX circuit of the present invention.

FIG. 7 is a block diagram showing another example of the Box circuit of the present invention.

The circuit of FIG. 7 is constituted of NORs 34, 35 and a delay circuit 36. The input signal 30 from the overcharge detecting circuit 25, the input signal 31 from the microcomputer 21, and the input signal 32 from the overcurrent detecting circuit 26 are respectively inputted. The output signal 33 is connected to the charge control transistor gate connection terminal 10. The delay circuit 36 delays a signal between the NOR 35 and the output signal 33 by a predetermined time.

In the case where "H" as the charge inhibiting signal is inputted as the input signal 30 from the overcharge detecting circuit 25, or "H" as the charge inhibiting signal is inputted as the input signal 31 from the microcomputer 21, and "L" as the discharge permitting signal is inputted as the input signal 32 from the overcurrent detecting circuit 26, "H" as the charge inhibiting signal is outputted as the output signal 33 with a lapse of a predetermined delay time by the delay circuit 36.

In the case where "H" as the charge inhibiting signal is inputted as the input signal 30 from the overcharge detecting circuit 25, or "H" as the charge inhibiting signal is inputted as the input signal 31 from the microcomputer 21, and "H" as the discharge inhibiting signal is inputted as the input signal 32 from the overcurrent detecting circuit 26, "L" as the charge permitting signal is outputted as the output signal 33 with a lapse of a predetermined delay time by the delay circuit 36.

As stated above, the Box circuit of FIG. 7 realizes the operation of the present invention by a simple circuit. That is, in the case where the discharge inhibiting signal is outputted from the overcurrent detecting circuit 26, at least the charge inhibiting signal from the microcomputer can be cancelled. Note that with respect to the delay circuit 36, a similar one can also be provided in FIG. 6.

As described above, in the battery state monitoring circuit, even if the charge inhibiting signal is inputted to the control terminal for the microcomputer, as long as the charge inhibiting signal of the control terminal for the microcomputer can be cancelled in the case where the overcurrent voltage detection terminal comes to have the overcurrent detection voltage, the present invention can adopt any circuit structure and is not limited to the embodiments.

According to the present invention, even if the charge inhibiting signal is inputted from the microcomputer in the case where the load is connected between the terminals EB+ and EB−, both the charge control transistor and the discharge control transistor are not turned OFF, whereby, there is provided an effect of preventing a lock mode in which a voltage cannot be supplied to the load. As a result, there can be obtained an effect of preventing such a disadvantage in that a power source cannot supply voltage while being used, and an effect of enhancing the reliability of the battery device.

As described above, according to the present invention, the circuit is added to cancel the charge inhibiting signal of the CTL terminal 13 in the case where the VMP terminal 12 comes to have the overcurrent detection voltage, even if the charge inhibiting signal is inputted to the CTL terminal 13, whereby the lock mode is prevented from occurring in which both the charge control transistor 14 and the discharge control transistor 16 are turned OFF and a battery voltage can not be supplied to a load.

What is claimed is:

1. A battery state monitoring circuit for controlling charging and discharging of a secondary battery in a battery device having one or more secondary batteries connected to external connection terminals and a charging switch and a discharging switch connected between the secondary batteries and the external connection terminals, comprising:

an overcharge detection circuit for producing an overcharge signal for turning off the charging switch when the secondary battery is in an overcharged state;

an overcurrent detection circuit for producing an overcurrent signal for turning off the discharging switch when the secondary battery is in an overcurrent state; and a circuit for canceling the overcharge signal to turn on the charging switch to permit charging of the secondary battery when the overcurrent state is detected during a period of time when the overcharge signal is being output.

2. A battery state monitoring circuit according to claim 1; further comprising a microcomputer input terminal for receiving an overcharge signal from a microcomputer to inhibit charging of the secondary battery.

3. A battery state monitoring circuit according to claim 2; wherein the circuit for canceling the overcharge signal inhibits the overcharge signal produced by the microcomputer and not the overcharge signal produced by the overcharge detection circuit.

4. A battery state monitoring circuit according to claim 2; wherein the circuit for canceling the overcharge signal comprises an inverter for inverting the overcharge signal output by the microcomputer, a NOR circuit for receiving output signals of the inverter and the overcurrent detection circuit as inputs, and an OR circuit for receiving output signals of the NOR circuit and the overcharge detection circuit as inputs and producing an output signal supplied to the charging switch.

5. A battery state monitoring circuit according to claim 2; wherein the circuit for canceling the overcharge signal comprises a first NOR circuit for receiving an output signal of the overcharge detection circuit and the overcharge signal output by the microcomputer as inputs, a second NOR circuit for receiving output signals of the overcurrent detection circuit and the first NOR circuit as inputs and producing an output signal supplied to the charging switch.

6. A battery state monitoring circuit according to claim 5; further comprising a delay circuit interposed between the output of the second NOR circuit and the charging switch.

7. A rechargeable battery device comprising: a rechargeable secondary battery; external connection terminals connectable to the secondary battery, to a load driven by the secondary battery, and to a charger for charging the secondary battery; a charge switch for selectively disconnecting the secondary battery from the external connection terminals; a discharge switch for selectively disconnecting the secondary battery from the external connection terminals; an overcharge detecting circuit for detecting an overcharged state of the secondary battery and generating an overcharge signal to turn off the charge switch when the overcharged state is detected; an overcurrent detection circuit for detecting an overcurrent state of the secondary battery and generating an overcurrent signal to turn off the discharge switch when the overcurrent state is detected; and a circuit for canceling the overcharge signal to turn on the charge switch when the overcurrent state is detected during a period of time when the overcharge signal is being output.

8. A rechargeable battery device according to claim 7; further comprising a microcomputer input terminal for receiving an overcharge signal from a microcomputer to inhibit charging of the secondary battery.

9. A rechargeable battery device according to claim 8; wherein the circuit for canceling the overcharge signal inhibits the overcharge signal produced by the microcomputer and not the overcharge signal produced by the overcharge detection circuit.

10. A rechargeable battery device according to claim 8; wherein the circuit for canceling the overcharge signal comprises an inverter for inverting the overcharge signal output by the microcomputer, a NOR circuit for receiving output signals of the inverter and the overcurrent detection circuit as inputs, and an OR circuit for receiving output signals of the NOR circuit and the overcharge detection circuit as inputs and producing an output signal supplied to the charging switch.

11. A rechargeable battery device according to claim 8; wherein the circuit for canceling the overcharge signal comprises a first NOR circuit for receiving an output signal of the overcharge detection circuit and the overcharge signal output by the microcomputer as inputs, a second NOR circuit for receiving output signals of the overcurrent detection circuit and the first NOR circuit as inputs and producing an output signal supplied to the charging switch.

12. A rechargeable battery device according to claim 11; further comprising a delay circuit interposed between the output of the second NOR circuit and the charging switch.

\* \* \* \* \*